(12) United States Patent
Kelley et al.

(10) Patent No.: US 6,586,671 B1
(45) Date of Patent: Jul. 1, 2003

(54) ABOVE GROUND TRACK SIGNAL TERMINAL APPARATUS

(75) Inventors: James Frank Kelley, Jacksonville, FL (US); Roger Don Owens, Jacksonville, FL (US); Jim F. Allarding, Tiffin, OH (US); Michael Dwayne Hutson, Cottage Grove, TN (US)

(73) Assignee: Interrail Signal, Inc., Jacksonville, FL (US)

( * ) Notice: Subject to any disclaimer, the term of this patent is extended or adjusted under 35 U.S.C. 154(b) by 0 days.

(21) Appl. No.: 10/213,316

(22) Filed: Aug. 6, 2002

(51) Int. Cl.$^7$ .................................................. H02G 9/00
(52) U.S. Cl. .............................. 174/38; 174/48; 174/51; 174/60
(58) Field of Search .............................. 174/37, 38, 48, 174/51, 60, 100

(56) References Cited

U.S. PATENT DOCUMENTS

| | | | |
|---|---|---|---|
| 1,462,026 A | | 7/1923 | Booth |
| 2,916,539 A | | 12/1959 | Hamilton |
| 3,033,912 A | | 5/1962 | Phillips |
| 3,153,116 A | | 10/1964 | Phillips |
| 3,162,718 A | | 12/1964 | Gunthel |
| 3,180,920 A | | 4/1965 | Fletcher et al. |
| 3,309,456 A | | 3/1967 | Connell |
| 3,404,212 A | | 10/1968 | Mack et al. |
| 3,435,124 A | | 3/1969 | Channell |
| 3,480,721 A | | 11/1969 | Baumgartner |
| 3,604,835 A | * | 9/1971 | Hamilton ..................... 174/38 |
| 3,652,779 A | | 3/1972 | Grinols |
| 3,691,288 A | * | 9/1972 | Sturdivan ..................... 174/38 |
| 3,740,452 A | * | 6/1973 | Bunten ......................... 174/38 |
| 3,868,474 A | | 2/1975 | Bunten |
| 3,991,264 A | * | 11/1976 | Connell ....................... 174/38 |
| 4,661,651 A | * | 4/1987 | Leschinger .................. 174/38 |
| 4,852,834 A | | 8/1989 | Hosman |
| 5,117,067 A | * | 5/1992 | Jaycox ......................... 174/38 |
| 5,210,374 A | * | 5/1993 | Channell ..................... 174/38 |
| 5,384,427 A | * | 1/1995 | Volk et al. .................... 174/37 |
| 5,401,902 A | * | 3/1995 | Middlebrook et al. ........ 174/37 |
| D415,109 S | | 10/1999 | Read et al. |
| 6,252,166 B1 | * | 6/2001 | Leschinger .................. 174/51 |
| 6,265,658 B1 | | 7/2001 | Silvers |
| 2001/0009191 A1 | | 7/2001 | Silvers |

* cited by examiner

*Primary Examiner*—Dean A. Reichard
*Assistant Examiner*—Adolfo Nino
(74) *Attorney, Agent, or Firm*—Thomas C. Saitta; Matthew W. Baca

(57) ABSTRACT

An apparatus for mounting a shunt or tunable joint coupler (TJC) that receives a railroad track signal from a railroad track wire. A conductive support post having a lower portion inserted into a ground surface provides above-ground mounting of the track signal terminal device. The track signal terminal device is mounted onto the support post in an electrically insulated manner. A block terminal attached to the conductive support post includes electrical contact points for electrically coupling the railroad track wire with leads from the track signal terminal device and further includes electrical contact points for electrically coupling a lightning arrestor with the conductive support post. A removable housing is attached to the conductive support post for providing an exterior encasement for the block terminal and the track signal terminal device. Within the removable housing, an electrostatic shield that is grounded to the conductive support post surrounds an above-ground portion of the railroad track wire.

9 Claims, 2 Drawing Sheets

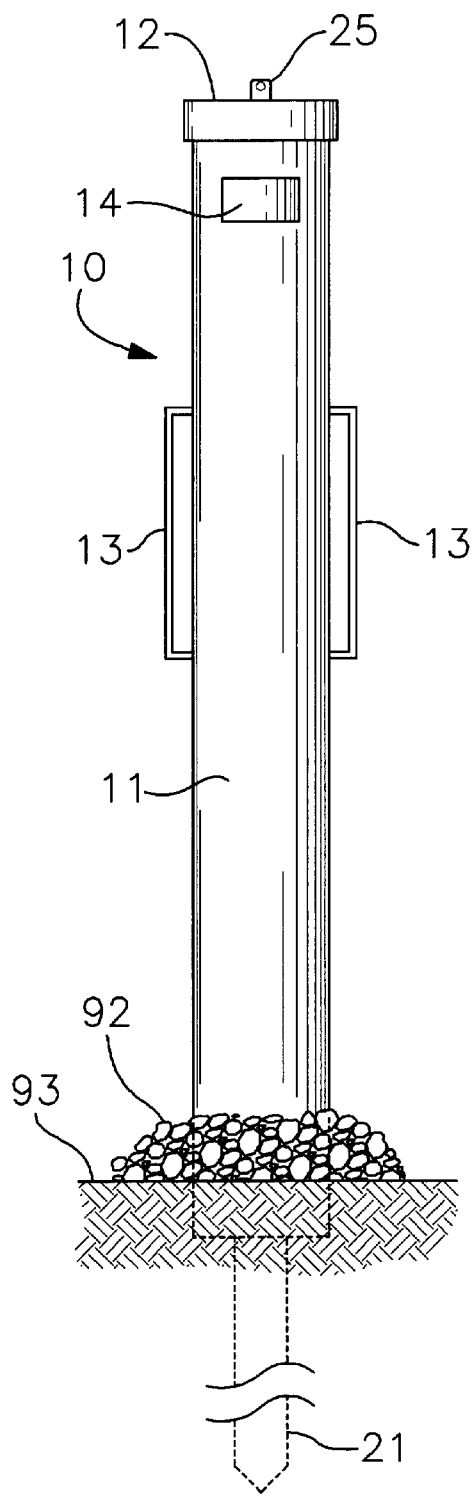
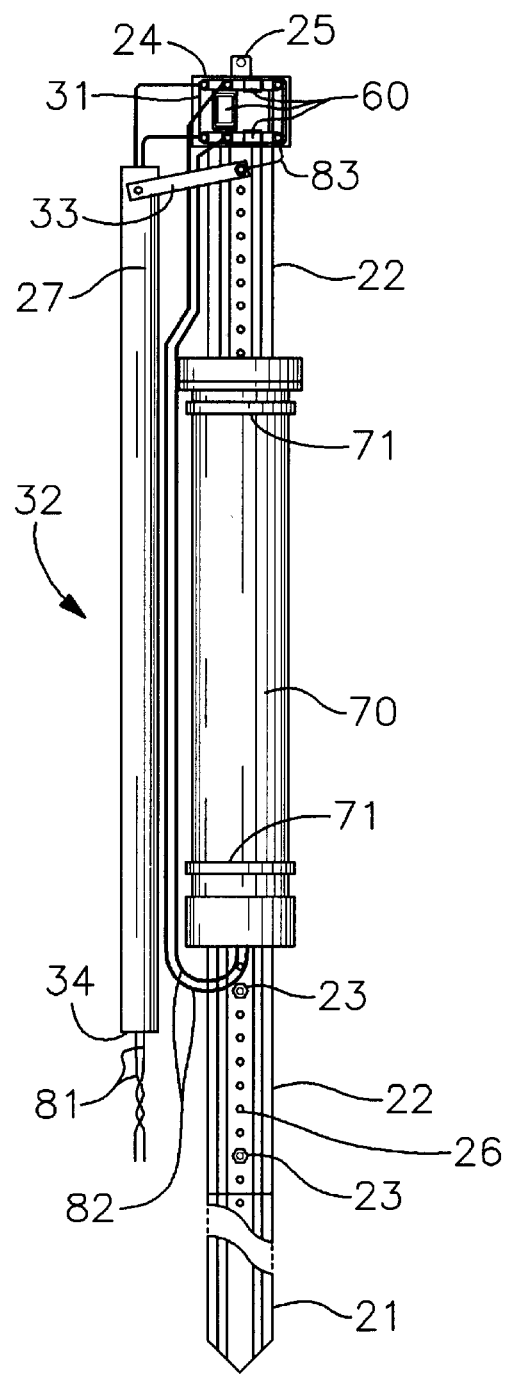
Fig. 1
Fig. 2

ABOVE GROUND TRACK SIGNAL TERMINAL APPARATUS

BACKGROUND OF THE INVENTION

1. Technical Field

The present invention relates generally to the field of above-ground enclosures that protect and provide access to electrical devices, cable terminals and the like. More particularly, the invention relates to such enclosures that are pedestal style housings mounted onto an anchor post and that incorporate lightning protection means, and even more particularly to such enclosures that encase shunts or tunable joint couplers (TJC) used in railroad track operations.

2. Description of the Related Art

Numerous constructions for above-ground enclosures that protect and provide easy access to electrical devices, cable terminals, etc., are well known. The enclosures are constructed of sturdy and durable material such as metal or hard plastic and are often provided with locking means. Examples of various pedestal-type enclosures used for these purposes can be found in U.S. Pat. Nos. 2,916,539, 3,033,912, 3,153,116, 3,162,718, 3,180,920, 3,309,456, 3,404,212, 3,435,124, 3,480,721, 3,652,779, 3,868,474, and 4,852,834.

In the railroad industry it is necessary to provide means to detect the presence of a train at certain locations, such as crossings. To accomplish this, shunts or tunable joint couplers (TJC) are positioned between or adjacent the railroad track, with wiring running from the tracks to the shunt or TJC. As utilized herein a "shunt" refers to a component of a loop shunt system that shunts (i.e. terminates the range of) a railroad track signal, while a TJC refers to a component of a railroad track signal loop system that extends the range of a railroad track signal. Characteristic of both a shunt and a TJC is that both receive a railroad track signal utilized to determine the location of a train in proximity to a railroad crossing or junction.

Shunts and TJCs are often buried between railroad tracks for protection. With a buried shunt or TJC, it is more difficult to access the device for repair or replacement, and the device is more susceptible to damage from physical or environmental events. An alternative means to protect the shunt or TJC is to provide a box-type housing set onto a concrete slab or concrete post adjacent the tracks. This provides easier access to the device, but requires the labor-intensive steps of forming a concrete slab or burying a concrete post. In addition, the relative permanence of such concrete limits the relocatability of shunts and TJC devices.

It can therefore be appreciated that a need exists for an improved pedestal enclosure utilized to encase and protect a railroad shunt or TJC which is easily installed adjacent the railroad track at the desired location. The present invention addresses such a need.

SUMMARY OF THE INVENTION

The invention is in general an above-ground track signal terminal apparatus located adjacent a railroad track and including a pedestal-style enclosure for protection of a railroad shunt or TJC. The enclosure is lockable, easily erected, provides easy access to the shunt or TJC device, protects the device from physical or environmental damage, including lightning strikes, and preferably provides information identifying the particular crossing to which the shunt or TJC is associated.

The invention comprises in general an anchor post to be driven into the ground, a mounting post connected to the anchor post, a terminal board for connection of electrical wires or cables mounted onto the mounting post, lightning protection means, a suspended, grounded, cable shield surrounding the wires leading to the railroad track, and a removable non-conductive housing to enclose the components, including the shunt or TJC.

The mounting post is connectable to the anchor post at various locations to enable the height to be adjusted. The cable shield surrounding the wires leading to the track is contained within and protected by the removable enclosure housing and is grounded to the mounting and anchor post combination. The shunt or TJC is mounted onto the mounting post using plastic ties or similar non-conductive fastening means so as to maintain electrical isolation from the mounting and anchor post combination. Locking means are provided to secure the housing to the mounting post.

BRIEF DESCRIPTION OF THE DRAWINGS

FIG. 1 is a side view showing the exterior of a track signal terminal apparatus in accordance with a preferred embodiment of the present invention;

FIG. 2 is a side view of the track signal terminal apparatus depicted in FIG. 1 with the housing removed;

DETAILED DESCRIPTION OF THE INVENTION

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

The present invention is directed to a track signal terminal apparatus including a pedestal enclosure that provides convenient access to the electrical components of a signal shunt or tunable joint coupler (TJC) device. As explained herein, the pedestal enclosure apparatus of the present invention provides adequate electrical shielding for the portion of rail wire extending above the ground into the shunt or TJC. In addition, the presently described pedestal enclosure includes a terminal block, connectors and other interior components, which provides protection against lightning strike, rain and other environmental effects, which is adaptable to any location, and which is lockable. As utilized herein with reference to the following description and claims, a "track signal terminal device" is utilized to designate either a shunt or a TJC.

Figure 4:
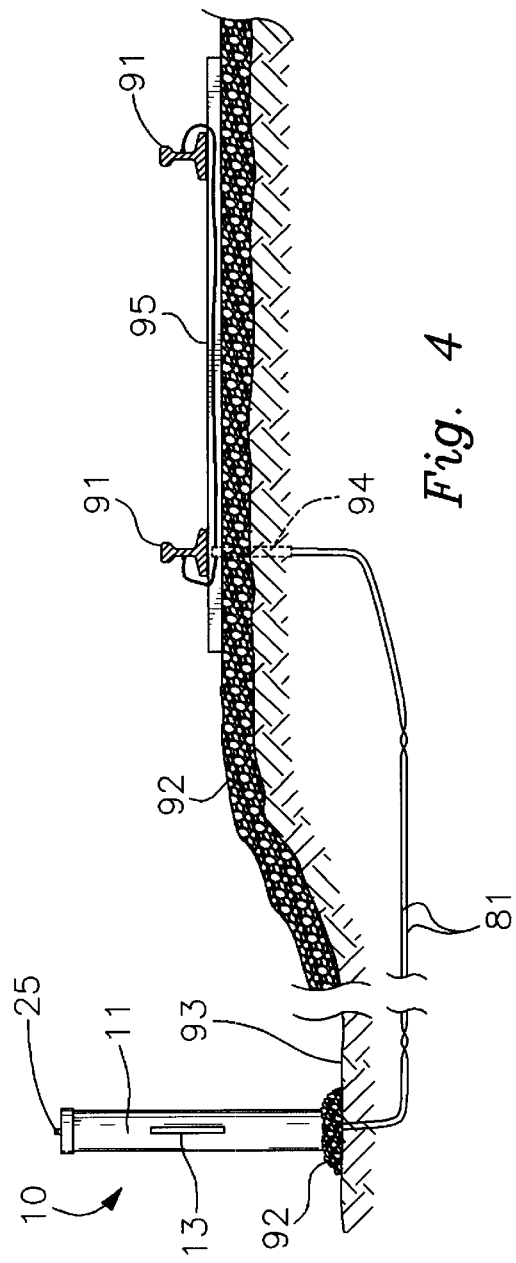
FIG. 4 is a view showing the track signal terminal apparatus of the present invention installed adjacent to a set of railroad tracks.

With reference now to the figures wherein like parts are identified by like and corresponding reference numerals throughout, and in particular with reference to FIG. 4 there is illustrated a view showing the track signal terminal apparatus of the present invention installed adjacent to a set of railroad track. As shown in FIG. 4, the track signal terminal apparatus 10 comprises in general an external housing member 11 composed of an electrically non-conductive material, such as PVC tubing, having a closed top, which may be formed by permanently attaching a cap member 12, also composed of a non-conductive material.

The housing 11 is preferably provided with side-mounted handles or gripping members 13 for easier removal of the housing 11 from the mounting post 22. A cap 12 or the top end of housing 11 is provided with an aperture or slot to receive an apertured locking tab 25, such that the locking tab protrudes through cap 12 a sufficient distance to allow for connection of a lock to secure the housing 11 onto the mounting post 22 so as to prevent unauthorized access to the interior of housing 11. In the depicted embodiment, apertured locking tab 25 is fixedly attached (by manufacture or subsequent attachment) to or an extension of mounting post 22.

The track signal terminal apparatus 10 is positioned a short distance from a pair of railroad tracks 91, preferably about ten feet from the near track 91, which are disposed atop a layer of ballast material 92 resting on a prepared earth surface 93 in known manner. A pair of track wires 81, such as for example insulated no. 6 AWG solid twisted pair wire, extend from the pedestal enclosure 10 to the railroad tracks 91, each of the track wires 81 linked by a bootleg rail connection kit 94 to an individual track 91. One track wire 81 is connected to the near track 91 and the other is preferably stapled along a tie member 95 to the far track 91. Preferably the track wires 81 are buried at least 30 inches below the earth surface 93. The track signal terminal apparatus 10 is erected so as to be vertically oriented with a portion of the housing 11 extending below the earth surface line 93, preferably about three inches for a housing 11 approximately 48 inches long, and is preferably surrounded at the exposed base by ballast material 92, as shown in FIG. 1. An information label 14 may be provided for the exterior of the housing 11 so that a particular track signal terminal device 70 (depicted in FIGS. 2 and 3) can be identified.

Figure 3:
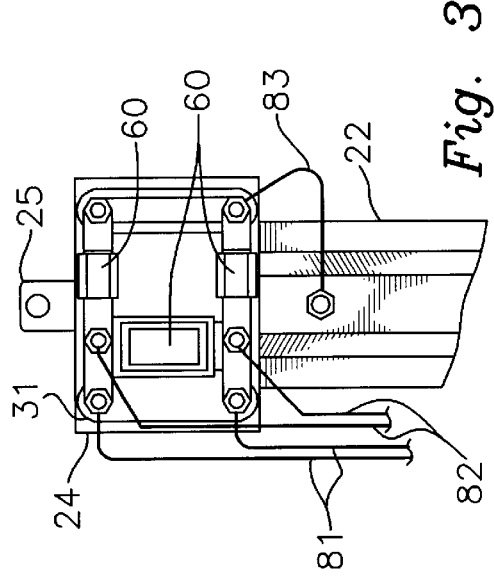
FIG. 3 is a partial view of the track signal terminal apparatus illustrated in FIGS. 2 and 3 showing the terminal board and lighting protection means.

As shown in FIGS. 2 and 3, the track signal terminal apparatus 10 further comprises in combination an anchor post 21, a mounting post 22, a mounting plate 24, a block terminal 31, lightning arrestor means 60, and a cable shield means 32. The anchor post 21 is preferably provided with a pointed end for easier insertion through the earth surface 93. The mounting post 22 is connected to the anchor post 21 using mechanical fasteners 23, with both posts 21 and 22 provided with spaced apertures 26 such that the overall length of the combination of the posts 21 and 22 can be adjusted as required, with a minimum overlap of 12 inches preferred. Preferably the posts 21 and 22 are non-linear in cross-section with corresponding configurations, such that lateral or angular relative movement is precluded once the posts 21 and 22 are mated for connection by the fasteners 23. Suitable dimensions for each post 21 and 22 are approximately 48 inches in length, which allows anchor post 21 to extend a good distance below the earth surface 93, preferably about 39 inches. A mounting plate 24 is provided at the upper end of mounting post 22 for receipt of a block terminal member 31.

As depicted in FIGS. 2 and 3, block terminal 31 includes contact points for electrically coupling track wires 81, which extend to the railroad tracks 91, with corresponding shunt wires 82, which extend to the track signal terminal device 70. Block terminal 31 further includes contact points for electrically coupling ground wires 83, which extend to the mounting post 22 and anchor post 21. Mounting post 22 and anchor post 21 are composed of a metal having suitable conductive and mechanical support properties, such as for example 10 gauge galvanized steel. In accordance with the depicted embodiment, block terminal 31 further includes at least one lightning arrestor means 60 of known type suitable for this application. The lightning arrestor means 60 prevents damage to the track signal terminal device 70 in the event of lightning strike. The aforementioned electrical components are connected in known manner to provide a proper circuit between the tracks 91 and the track signal terminal device 70, and between the lightning arrestor means 60 and the mounting post 22. The track signal terminal device 70 may be of any known or suitable type, and is mounted onto the mounting post using electrically non-conductive mounting means 71, such as plastic tie straps composed of nylon or similar material, preferably with at least 12 inches of mounting post 22 extending below the track signal terminal device 70.

The track signal terminal apparatus 10 further comprises an electrically grounded cable shield 32, which is a tubular member suspended within the housing 11 and disposed around the portion of the track wires 81 extending above ground into track signal terminal apparatus 10. The cable shield 32 is composed of an electrically conductive material and surrounds the track wires 81 to shield the track wires 81 from introducing potentially damaging electrostatic spikes, such as those induced by the electrostatic effects of lightning, into the track signal terminal device 70. More specifically, and in a preferred embodiment of the present invention, the cable shield 32 is a faraday shield (sometimes referred to as a "faraday cage") with respect to track wires 81. Faraday shields are well known to those skilled in the art as an electrostatic shield made by placing conductive material (typically a braid or net of copper or aluminum wire) around the object device and connecting the conductive material to ground. Specifically, the faraday shield is preferably situated within the inner surface of the cable shield 32 directly surrounding the tracks wires 81. Cable shield 32 preferably includes a flexible, non-conductive outer cover 27. A grounding strap 33 is utilized to provide electrical and mechanical connection of the cable shield 32 to the mounting post 22 (and therefore to ground through anchor post 21). Cable shield 32 is preferably positioned such that its bottom end 34 does not contact the earth surface 93.

Installation of the invention is accomplished by properly connecting the track wires 81 to the tracks 91 and extending the track wires 81 underground to the side of the tracks. The anchor post 21 is driven a sufficient distance into the ground and the mounting post 22 is then attached at the proper height such that the housing 11 will extend a short distance into the ground when mounted onto the mounting post 22. The track wires 81 are inserted through the cable shield 32 and connected to the block terminal 31, the lightning arrestor means 60 and shunt wires 82 also being connected in circuit on block terminal 31. The housing 11 is then placed onto the mounting post 22 and secured, with proper identifying information provided on information label 14.

It is contemplated that equivalents and substitutions for certain elements and components set forth above may be obvious to those skilled in the art, and therefore the true scope and definition of the invention is to be as set forth in the following claims.

What is claimed is:

1. A track signal terminal apparatus comprising:
   a track signal terminal device mounted above-ground onto a conductive support post having a lower portion inserted into a ground surface adjacent to a set of railroad tracks, wherein said track signal terminal device is a railroad signal shunt device or a tunable joint coupler device that receives a track signal from an unshielded twisted pair railroad track wire which is coupled across said set of railroad tracks to detect oncoming train traffic;

non-conductive mounting means for mounting the track signal terminal device onto said conductive support post in an electrically insulated manner;

a removable electrostatic shield suspended from said conductive support post, said removable electrostatic shield surrounding an above-ground portion of the unshielded twisted pair railroad track wire and grounded to said conductive support post;

a block terminal attached to said conductive support post, said block terminal including:
 coupling means for electrically coupling the unshielded twisted pair railroad track wire with the track signal terminal device; and
 coupling means for electrically coupling a lightning arrestor means with said conductive support post; and a removable housing attached to the conductive support post for providing an exterior encasement for said block terminal, the track signal terminal device, and said suspended, removable electrostatic shield.

2. The track signal terminal apparatus of claim 1, wherein said removable housing is fabricated of a non-corrosive and non-conductive material.

3. The track signal terminal apparatus of claim 1, wherein said removable housing includes a housing aperture for receiving an apertured locking tab that is fixedly attached to said conductive support post, said apertured locking tab protruding through said housing aperture to enable connection of a lock to secure said removable housing to said conductive support.

4. The track signal terminal apparatus of claim 1, wherein said coupling means for electrically coupling the railroad track wire with the track signal terminal device includes electrical contacts within said block terminal for electrically coupling lead wire from the track signal terminal device with the railroad track wire.

5. The track signal terminal apparatus of claim 1, wherein said conductive support post comprises:
 an anchor post; and
 a mounting post, wherein the mounting post is connected to the anchor post using mechanical fasteners selectably inserted into spaced apertures in accordance with a desired length of the conductive support post.

6. The track signal terminal apparatus of claim 5, wherein the anchor post includes a pointing end member.

7. The track signal terminal apparatus of claim 1, wherein said electrostatic shield is suspended from said conductive support post such that it does not contact the ground surface.

8. The track signal terminal apparatus of claim 1, wherein said electrostatic shield is a faraday shield having a flexible, non-conductive outer cover.

9. The track signal terminal apparatus of claim 1, wherein the block terminal further includes coupling means for electrically coupling said electrostatic shield and said conductive support post.

* * * * *